(12) United States Patent
Pratt (10) Patent No.: US 10,136,126 B1
(45) Date of Patent: Nov. 20, 2018

(54) SEINE NET CALIBRATION TARGET FOR IMAGE SENSOR

(71) Applicant: Patricia D. Pratt, Redondo Beach, CA (US)

(72) Inventor: Patricia D. Pratt, Redondo Beach, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 251 days.

(21) Appl. No.: 15/349,723

(22) Filed: Nov. 11, 2016

(51) Int. Cl.
*H04N 17/02* (2006.01)
*H04N 17/00* (2006.01)
*G06T 7/00* (2017.01)
*H05B 37/02* (2006.01)
*A01K 73/00* (2006.01)
*A01K 75/02* (2006.01)
*A01K 71/00* (2006.01)
*B63B 35/16* (2006.01)

(52) U.S. Cl.
CPC .......... *H04N 17/002* (2013.01); *A01K 71/00* (2013.01); *A01K 73/00* (2013.01); *A01K 75/02* (2013.01); *B63B 35/16* (2013.01); *G06T 7/0018* (2013.01); *H05B 37/0272* (2013.01); *G06T 2207/10036* (2013.01); *G06T 2207/30192* (2013.01)

(58) Field of Classification Search
CPC ...... G02B 2027/0138; G02B 2027/014; G02B 27/0172; G02B 26/101; G02B 26/108; G01B 9/02007; G01C 21/20; G01C 21/206; G01C 17/00; G01C 11/02; G01C 11/00; G01C 11/025; G01C 11/12; G01C 3/08; G01N 2021/1797; G01N 2021/4733; G01N 21/4738
See application file for complete search history.

(56) References Cited

U.S. PATENT DOCUMENTS 5,069,109 A * 12/1991 Lavan, Jr. ................ B63G 9/04
 114/240 C
8,767,210 B1 7/2014 Lukahsin et al.
2016/0156100 A1* 6/2016 Sikina ................... H01Q 3/267
 342/352

OTHER PUBLICATIONS

Rao, et al. "Post-launch calibration of meteorological satellite sensors." *Advances in Space Research* 23.8 (1999): 1357-1365.

* cited by examiner

*Primary Examiner* — Michael P Stafira
(74) *Attorney, Agent, or Firm* — Tarolli, Sundheim, Covell & Tummino LLP (57) ABSTRACT

A seine net calibration target for an image sensor can include a given set of seine nets connected to form a polygon and another set of seine nets. Each seine net of the other set of seine nets is coupled to a vertex of the polygon at a given end and coupled to a respective one of a plurality of boats at another end. The seine net calibration target can also include a plurality of light sources arranged along a top edge of the given set of seine nets and the other set of seine nets. The plurality of light sources emits light at a predetermined wavelength.

20 Claims, 4 Drawing Sheets

SEINE NET CALIBRATION TARGET FOR IMAGE SENSOR

TECHNICAL FIELD

This disclosure relates to a seine net calibration target for an image sensor.

BACKGROUND

Meteorological satellites operating in geostationary orbits around the Earth provide observations of the Earth's surface and clouds. Images in or near the visible spectral domain can be used for the weather forecast and for monitoring important climate variables such as the surface insolation, surface albedo, pollution, smog and cloud characteristics. In some examples, such meteorological satellites can employ hyperspectral imaging.

Calibrating imagers is a common pre-processing step for remote sensing analysts that need to extract data and create scientific products from images. Calibration attempts to compensate for radiometric errors from sensor defects, variations in scan angle, and system noise to produce an image that represents true spectral radiance at the sensor.

SUMMARY

One example relates to a seine net calibration target for an image sensor that can include a given set of seine nets connected to form a polygon and another set of seine nets. Each seine net of the other set of seine nets is coupled to a vertex of the polygon at a given end and coupled to a respective one of a plurality of boats at another end. The seine net calibration target can also include a plurality of light sources arranged along a top edge of the given set of seine nets and the other set of seine nets. The plurality of light sources emits light at a predetermined wavelength.

Another example relates to a seine net calibration target for an image sensor that can include a given set of seine nets connected to form a hexagon and another set of seine nets. Each seine net of the other set of seine nets can be coupled to a vertex of the hexagon at a given end and coupled to a respective one of a plurality of boats at another end. The seine net calibration target can also include a plurality of floats arranged at a top edge of the given set of seine nets and the other set of seine nets. Each of the plurality of floats can include a plurality of light sources emitting light at a predetermined wavelength and a controller that controls the output of the light sources.

Yet another example relates to a seine net calibration target for an image sensor that can include a given set of seine nets connected to form a polygon and another set of seine nets. Each seine net of the other set of seine nets can be coupled to a vertex of the polygon at a given end and coupled to a respective one of a plurality of boats at another end. Each seine net in the given set of seine nets and the other set of seine nets has a plurality of light sources arranged along a top edge of the respective seine net. The plurality of light sources emits light at a predetermined wavelength or range of wavelengths and the emitted light is sufficient to saturate at least one pixel of the image sensor.

DETAILED DESCRIPTION

This disclosure relates to calibrating multispectral and hyperspectral imagery devices (on-board image sensors) of airborne vehicles and/or satellites for reducing imaging errors using a seine net calibration target that is implemented as an in-situ illuminated water floating light system. The seine net calibration target can be formed from one or more seine nets (water floating nets) having a given length in meters (m) that can be arranged in a particular manner on a surface of water for use in calibrating the on-board optical sensors.

In one example, a given set of the plurality of seine nets are arranged on the surface of water to define a hexagonal area and another set of the plurality of seine nets are attached to respective vertices of the hexagonal area and arranged on the surface of water to radially extend away from a center of the hexagonal area. Arranging the given set and the other set of the plurality of seine nets collectively forms a water-platform on the surface of water for the seine net calibration target.

In some examples, a top edge of a given seine net can include a plurality of floaters (buoyant floatation devices) that have a plurality of light sources, such as light emitting diodes (LEDs) embedded therein. In other examples, light sources such as LEDs or fiber optic cables can be embedded in a rope forming the top edge of the given seine net. The light emitted by these light sources can be the same or different colors. These light sources can be controlled to emit light alternately or concurrently to provide an illuminated water-platform that can be used as a light source for calibrating the on-board image sensors. Airborne vehicles and/or satellites can be configured to fly-over the seine net calibration target such that pixels of the multispectral and hyperspectral imagery devices can be calibrated to reduce the imaging errors in such devices.

Stringing a series of nets together in a predetermined manner described herein can produce a bright-light "edge" needed for geolocation to perform the Modulation Transfer Function (MTF) commonly used in satellite calibration. In the present examples described herein, the term "bright light" denotes light on nearly any part of the electromagnetic (EM) wave spectrum.

Figure 1:
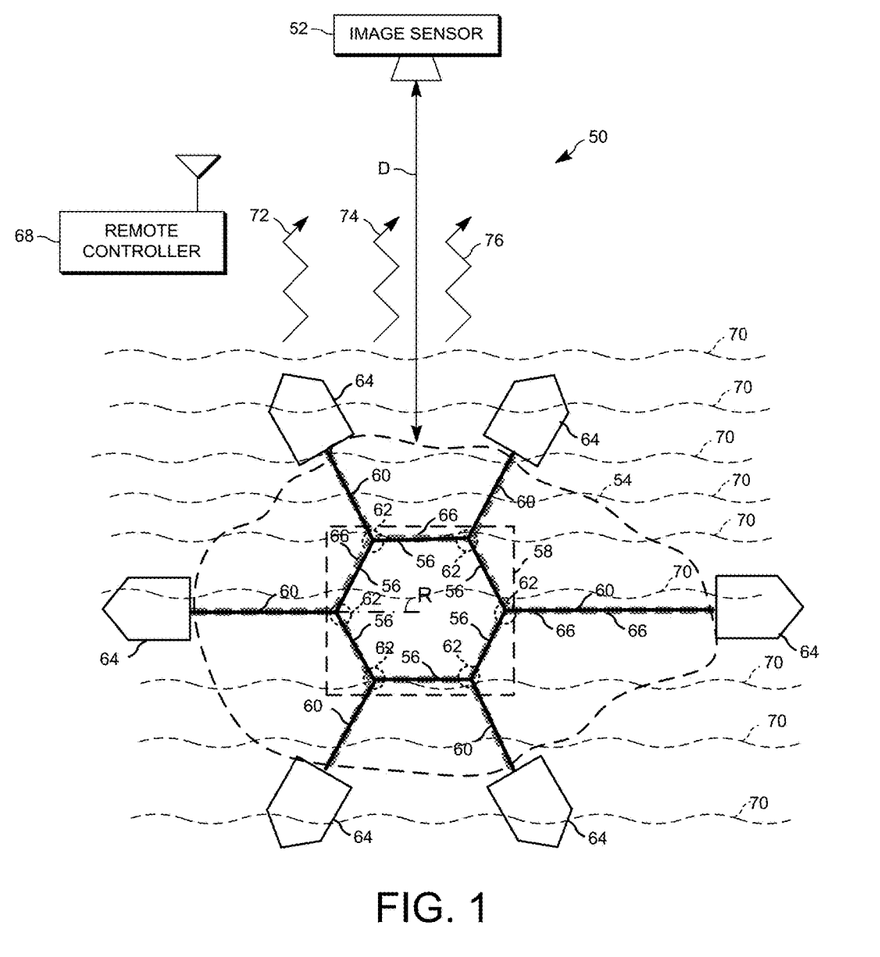
FIG. 1 illustrates an example of a system for calibrating an image sensor.

FIG. 1 illustrates an example of a system 50 for calibrating an image sensor 52. The image sensor 52 can be an airborne imager (e.g., an on-board optical sensor). For instance, the image sensor 52 can be deployed on an aircraft or a satellite. The image sensor 52 can be a multispectral image sensor or a hyperspectral image sensor. As used herein, the term multispectral denotes a plurality of discrete bands in the EM wave spectrum. In such a situation, the image sensor 52 can be configured to receive EM waves in 3 or more bands (e.g., corresponding to red, blue and green). Alternatively, the image sensor 52 can be implemented as a hyperspectral image sensor and can be configured to receive EM waves in 100 bands or more (e.g., 300 bands or more). Additionally, as used herein, the term "hyperspectral" denotes a plurality of continuous bands in the EM wave spectrum, wherein each of the bands have a bandwidth of about 15 nanometers (nm) or less (e.g., 3 nm to 15 nm).

The image sensor 52 can be configured to capture images of a given area. As noted, the image sensor 52 is airborne, such that the given area can be a specific geographic area of the Earth. In some examples, the specific geographic area can include land and/or water.

Due to environmental variables (e.g., change of temperature, vibrations, etc.), the image sensor 52 may need calibration on a periodic and/or as-needed (e.g., ad-hoc) basis. In such a situation, the image sensor 52 can be configured to capture an image of a seine net calibration target 54. The seine net calibration target 54 can have predetermined size, color and functional characteristics that can be relied upon by the image sensor 52 to facilitate calibration. As described herein, the seine net calibration target 54 can be relatively buoyant for deployment in a body of water. Additionally, in some examples, the seine net calibration target 54 can have a slightly negative buoyancy to allow the light provided by the seine net calibration target 54 to first travel through a lens of water for measuring the signal after the water has absorbed and scattered the light thus allowing for characterizing the properties of the water.

The seine net calibration target 54 can be formed from K number of seine nets that are arranged (and attached) to form a radial shape, where K is an integer greater than or equal to one. In situations where there is more than one net (e.g., the K number of nets are strung together), a given set of seine nets 56 are arranged form a polygon 58 (e.g., an enclosed area) and another set of nets 60 provide radial arms that are each connected to a vertex 62 of the polygon 58 on a given end and to one boat 64 (e.g., a fishing vessel) of N number of boats on another end, where N is an integer equal to the number of vertices 62 of the polygon 58. Each seine net 56 in the given set of seine nets 56 can be referred to as a "polygon seine net 56" and each seine net 60 in the other set of seine nets 60 can be referred to as a "radial seine net 60". Moreover, in the present example, the polygon 58 is illustrated as being a hexagon, such that there are 6 boats 64. However, in other examples, the polygon 58 can have more or less sides (and therefore, more or less boats 64 can be employed to deploy the seine net calibration target 54).

Each of the N number of boats 64 can apply tension to a corresponding one of the radial seine nets 60, which in turn applies tension at the vertices 62 of the polygon 58, thereby maintaining the shape of the polygon 58. Each of the K number of seine nets (from the polygon seine nets 56 and the radial seine nets 60) can have floats 66 that are formed of buoyant material. Additionally or alternatively, in the K number of seine nets may be formed of material that provides sufficient buoyancy to float without the need for the floats 66. Moreover, for purposes of simplification of explanation, not all of the floats 66 are labeled in FIG. 1.

A top edge of the seine net calibration target 54 (formed from the polygon seine nets 56 and the radial seine nets 60) can emit light. In some examples, the light can be emitted from the floats 66, which can have a light source (e.g., an LED) embedded therein to emit the light.

Figure 2:
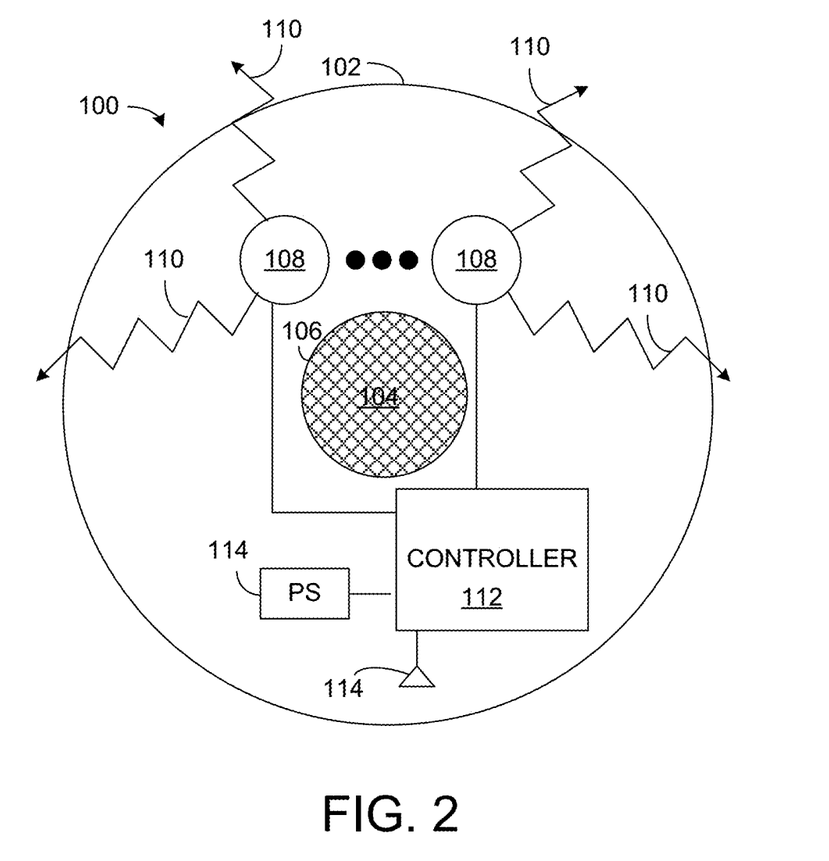
FIG. 2 illustrates an example of a float for a seine net calibration target.

FIG. 2 illustrates an example of a float 100 that can be employed to implement one of the floats 66 of FIG. 1 in situations where the floats 66 are configured to emit the light. The float 100 can have a casing 102. The casing 102 can be formed from a rigid, transparent or translucent material, such as glass or plastic. The float can have a rope 104 passing through a cavity 106 of the float 100. The casing 102 can be waterproof, and can have a torus shape (e.g., doughnut shape) or a hollow cylindrical shape. The rope 104 can be a portion of a seine net (e.g., one of the seine nets 56 or 60 of FIG. 1) that extends along a top edge of the seine net.

The casing 102 can house components of the float 100. In particular, the float 100 can include J number of light sources 108, where J is an integer greater than or equal to one. The J number of light sources 108 can emit light, represented as arrows 110 that can penetrate the casing 102. In some examples, each of the J number of light sources 108 (or some subset thereof) can emit a different color. In other examples, each of the J number of light sources 108 can emit the same color. Each of the light sources 108 can be, for example, a light emitting diode (LED). In such a situation, each of the light sources 108 (LEDs) can be configured to emit light at varying power levels in one or more predetermined bands.

The J number of light sources 108 can be controlled by a controller 112. The controller 112 can be, for example, a microcontroller. The controller 112 can control the intensity of the light emitted by the J number of light sources 104. Additionally, in examples where different light sources 104 emit different colors, the controller 112 can control which light sources 104 output light, thereby controlling the color of light output by the float 100.

The controller 112 can include a wireless interface coupled to an antenna 114 that communicates with an external device (e.g., a computing device). The controller 112 can receive commands from the external device via the wireless interface that causes the controller 112 to control the output of the J number of light sources 104.

The controller 112 can include a power source 116 that provides power to the controller 112. The power source 116 can be, for example a battery, a photo-voltaic cell, etc. In some examples, the casing 102 can be designed to allow access to the power supply 116 (e.g., to replace the battery).

Referring back to FIG. 1, in other examples ropes, forming the top edge of the seine net calibration target 54 can have fiber optic cabling embedded therein that emits the light. In such a situation, a light source (e.g., a laser) affixed to one or more of the boats 64 can inject light into the fiber optic cable. In still other examples, light sources (e.g., LEDs) can be scattered/embedded in the rope forming the top edge of the seine net calibration target 54 to emit the light. In these example, the rope forming the top edge of the seine net calibration target 54 (via the fiber optic cables or the light sources) can be configured to emit light at varying power levels and in one or more predetermined bands for calibration of the image sensor 52.

In some examples, the floats 66 (such as examples where the floats 66 have light sources embedded therein), can communicate with an external system, such as a remote controller 68 to facilitate the control of the output of the light, as described herein. In examples where the boats 64 inject light into the seine net calibration target 54, equipment on the boats 64 can communicate with the remote controller 68, which can control the output of the light emitted by the seine net calibration target 54. In this manner, the remote controller 68 can directly (or indirectly) control the light output by the seine net calibration target 54.

The polygon 58 of the seine net calibration target 54 can have a circumradius, $R_p$ of up to about 175 meters (m), such that the polygon 58 can have a maximal diameter, $D_p$ of about 350 m. Moreover, in situations where the polygon 58 is a hexagon, the length, $L_p$ of each of the polygon seine nets 56 can be approximately equal to the circumradius, $R_p$ of the polygon 58. In other situations, the length of each of the polygon seine nets 56 can be different than the circumradius, $R_i$ of the polygon 58.

Additionally, each radial arm formed by the radial seine nets 60 has a length, $L_R$ of up to about 1500 meters (1.5 kilometers (km)). Accordingly, the seine net calibration target 54 can have a total length, $L_{Total}$, which can be calculated with Equation 1. Thus, based on a maximum circumradius, $R_p$ of about 175 m and a maximum radial arm length $L_R$ of about 1500 m, the seine net calibration target 54 can have a total length $L_{Total}$ of up to about 3350 m.

$$L_{Total} = 2R_p + 2L_R \quad \text{Equation 1:}$$

Moreover, as demonstrated, in situations where the polygon 58 is a hexagon, even though the total length of the seine net calibration target 54, $L_{Total}$ can be up to about 3350 m (3.35 km), each of the polygon seine nets 56 need only to have a length of up to about 175 m and each of the radial seine nets 60 needs to only have a length of up to about 1500 m (1.5 km).

Each of the polygon seine nets 56 and the radial seine nets 60 can have a height of up to about 150 m (often about 10 m), to define a height of the polygon seine nets 56 and the radial seine nets 60, thereby defining a height of the seine net calibration target 54. The height of the seine net calibration target 54 can be based, for example on a desired depth of the top edge of the seine net calibration target 54. That is, the greater the depth of the seine net calibration target 54, the greater the overall mass, thereby adding a negative buoyancy to the seine net calibration target 54, and pulling the seine net calibration target 54 beneath a surface of a body of water 70, in which the seine net calibration target 54 is deployed.

In operation, the seine net calibration target 54 can be employed in a manner that simulates the wide spectrum of light naturally emitted by the sun with a completely (or nearly completely) black sky. In particular, the K number of seine nets 56 and 60 can be organized such that a bright source of light can be generated, particularly at night such that the image sensor 52 (e.g., deployed on a satellite) can measure radiance and establish geolocation. Additionally, in some examples, the K number of seine nets 56 and 60 can be positioned to concurrently provide the wide spectrum of colors that are naturally generated by the sun.

For example, the seine net calibration target 54 can be sized and/or illuminated in a manner that the image sensor 52 can capture a measurable quantity of light of at least 7.9 photons per every 91 meters (about 300 feet) of a distance "D" between the image sensor 52 and the seine net calibration target 54 if the image sensor 52 is traveling at a high velocity (e.g., such as in a satellite moving at a rate of about 7000 m/s). In situations where the image sensor 52 is traveling slower, the image sensor 52 is likely able to operate properly while capturing a higher number of photons per 91 meters of the distance D from the longer dwell time or lower altitude. Such illumination can be generated at the floatation devices 56 of the seine net calibration target 54. Additionally, it is noted, that in many examples, the seine net calibration target 54 can generate light several orders of magnitude greater than the minimum needed to be detected by the image sensor 52.

In a situation where the image sensor 52 is mounted on an aircraft, each pixel of the image sensor 52 can correspond to an area size of at least 5 meters (m) by 5 meters. Accordingly, in such a situation, the seine net calibration target 54 has a total area, $A_{Total}$ of at least about 25 square meters (m$^2$) or more, wherein the total area, $A_{Total}$ can be approximately the area of a circle circumscribing the radial seine nets 60. In situations where the image sensor 52 is mounted on a satellite, each pixel of the image sensor 52 can correspond to an area size of at least 250 m by 250 m. Accordingly, the seine net calibration target 54 can have a total area, $A_{Total}$ of at least about 62,500 m$^2$. As noted, the size of the seine net calibration target 54 can be proportional to the predetermined approximate distance, D of separation between the image sensor 52 and the seine net calibration target 54. That is, the larger the predetermined approximate distance, D of separation between the image sensor 52 and the seine net calibration target 54, the larger the seine net calibration target 54 may be.

Furthermore, as noted, the seine net calibration target 54 can have a total length $L_{Total}$ of up to about 3350 m. In such a situation, an (imaginary circle) circumscribes the seine net calibration target 54 would have an area of about 8814131 m$^2$ (8.814131 km$^2$). In this situation, the seine net calibration target 54 can provide a total area, $A_{Total}$ that exceeds a typical sized pixel aggregation for a Low Earth Observing (LEO) satellite (which pixel aggregation is typically about 1 km$^2$).

The seine net calibration target 54 can output visible light rays with a specific radiance via the light sources (e.g., LEDs or fiber optic cables). In particular, the light waves output by the seine net calibration target 54 can be a single color or a mix of colors on a predetermined set of spectral bands (e.g., a single spectral band or a plurality of spectral bands). The light rays output by the K number of seine nets 56 and 60 are depicted in FIG. 1 as arrows 72, 74 and 76. The predetermined set of spectral bands can correspond to the spectral bands detectable by the image sensor 52.

As noted, the seine net calibration target 54 can be deployed in a body of water represented as dotted lines 70. The body of water 70 can be, for example, an ocean, sea or lake. In some examples, the seine net calibration target 54 can be floating in water, and in other examples, the top edge of the seine net calibration target 54 can be submerged up to a depth of about 5 m (often about 1 m), wherein the maximum depth varies based on the clarity of the body of water 70.

The image sensor 52 can capture/sample a portion of the light rays 72, 74 and 76 emitted by the light sources of the seine net calibration target 54. The light output by the seine net calibration target 54 (indicated by the light rays 72, 74 and 76) can have sufficient luminance (e.g., brightness) to saturate at least one pixel of the image sensor 52. Moreover, since the wavelengths and frequencies radiated from the polygon seine nets 56 and the radial seine nets 60 are predetermined and can be programmed into the image sensor 52, the image sensor 52 can be calibrated. The calibration of the image sensor 52 can compensate for errors/drift caused by environmental conditions (e.g., temperature), atmospheric variables (e.g., airborne dust, water zone vapor, etc.) and/or atmospheric attenuations.

In some examples, the image sensor 52 can include a plurality of sub-image sensors that each detects a different, single, spectral band of light. For instance, in such a situation, the image sensor 52 could include 3 sub-image sensors that detect red, blue and green light, respectively. In this situation, during a calibration procedure, the output of the polygon seine nets 56 and the radial seine nets 60 can be changed periodically and/or asynchronously to fine tune calibration of each of the plurality of sub-image sensors of the image sensor 52.

In one example, during a calibration procedure, the remote controller 68 can cause each of the K number of seine nets 56 and 60 (or some subset thereof) to output a solid color in a particular spectral band to be detected by a particular sub-image sensor of the image sensor 52. For example, the K number of seine nets 56 and 60 can output a red color and the sub-image sensor of the image sensor 52 that detects red can be calibrated, which sub-image sensor can be referred to as a red sub-image sensor. Additionally, in this situation, the remote controller 68 can cause the light sources of the seine net calibration target 54 to output a blue color for the red sub-image sensor of the image sensor 52. During this portion of the calibration, the amount of blue light detected by the red sub-image sensor can be measured to determine an amount of "cross talk" corresponding to an unwanted transfer signal detected by the red sub-image sensor.

Additionally or alternatively, the remote controller 68 can cause different cause the light sources of the seine net calibration target 54 to output different solid colors. For example, the remote controller 68 can cause a first set of light emitting devices to output a red color, a second set of the light sources output a blue color and a third set of the light sources to output a green color. In such a situation, the light rays 72, 74 and 76 can represent different colors. In situations where the light rays 72, 74 and 76 are different colors, the image sensor 52 can detect the output of the seine net calibration target 54 as a single color since the colors aggregate, integrate and combine over the distance D between the image sensor 52 and the seine net calibration target 54 similarly to natural and desired targets on the earth's surface of interest to the image sensor 52. Establishing a known source gives insight into the validation of real targets needed by mission objectives.

Additionally or alternatively, the intensity of light output by the light sources of the seine net calibration target 54 can be varied to change the color observed by the image sensor 52. By combining a variance in intensity and color of light output by the light sources, nearly any color can be output by the seine net calibration target 54. Accordingly, the seine net calibration target 54 can be employed to calibrate the image sensor 52 in situations where the image sensor 52 employs a large spectrum of detectable bands, such as a hyperspectral image sensor.

In other examples, the seine net calibration target 54 can be employed in a plant functional typing procedure for aquatic life. Each species of phytoplankton absorbs and transmits different light waves. Accordingly, the remote controller 68 can control the output of the light sources (LEDs or fiber optic cables) of the seine net calibration target 54, which can cause the light sources to output light at a predetermined wavelength, which can be shined through/on phytoplankton of a specific species and the light transmitted through the specific species can be measured. For instance, the predetermined wavelength can be from about 350 nanometers (nm) to about 685 nm. In such a situation, the image sensor 52 can detect and measure the amount of light and the wavelength of the light transmitted by the seine nets 56 and 60 and through the phytoplankton. This measurement can be employed (e.g., by the remote controller 68 or another computing device) to determine the species of the phytoplankton, as well as the density of the phytoplankton in the body of water 70.

The seine net calibration target 54 can be easily deployed and/or retracted by one or more of the boats 64 in a remote location that is away from artificial sources of light (e.g., cities) to maintain a dark background to increase the contrast between the seine net calibration target 54 and the body of water 70. For instance, to deploy the seine net calibration target 54, one of the boats 64 can deploy the K number of seine nets 56 and 60 and the remaining boats 64 can hook an end of one of the ends of the radial seine nets 60 to apply tension and form/maintain the shape of the polygon 58. Moreover, in some examples, the seine net calibration target 54 can be deployed in a temporary manner (e.g., 1-2 days). In other examples, the seine net calibration target 54 can be deployed in a permanent/semi-permanent manner, and only minimal and infrequent maintenance, such as battery recharging/changing and/or anti-biofouling techniques may be needed.

Figure 3:
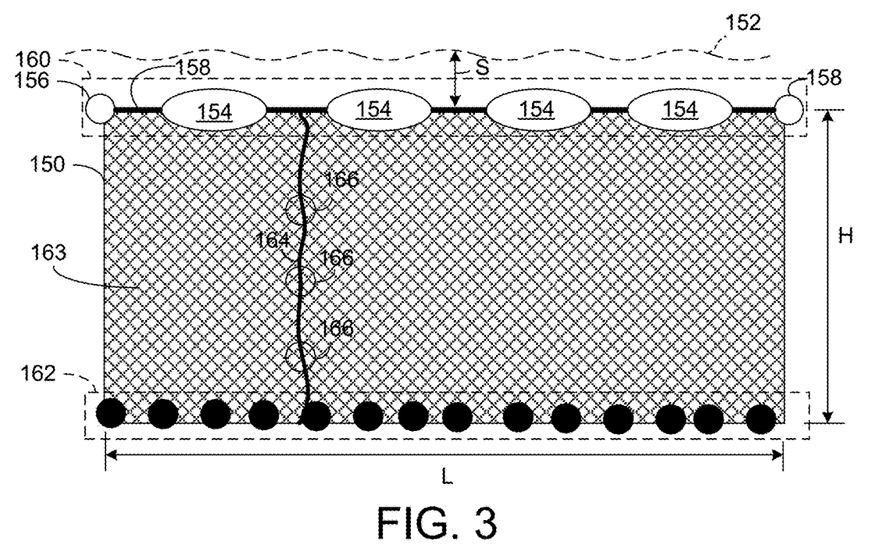
FIG. 3 illustrates a seine net for a seine net calibration target.

FIG. 3 illustrates an example of a seine net 150 that can be employed to implement one of the polygon seine nets 56 or the radial seine nets 60 illustrated in FIG. 1. The seine net 150 is deployed in a body of water, which has a surface represented as 152. The seine net 150 can include floats 154 that can provide buoyancy for the seine net 150. In some examples, the floats 154 can be implemented in a manner similar to the float 100 illustrated in FIG. 2. In other examples, the floats 154 may be passive (non-electrical) devices.

The seine net 150 can include a given end 156 and another end 158. In situations where the seine net 150 is implemented as a polygon seine net 56, each of the given end 156 and the other end 158 can be attached to other seine nets to form an edge of a polygon (e.g., a hexagon). In situations where the seine net 150 is implemented as a radial seine net 60 the given end 156 of the seine net 150 can be attached to a boat (e.g., one of the boats 64 of FIG. 1) and the other end 158 can be attached to a vertex of a polygon of seine nets (e.g., a vertex 62 of FIG. 1).

The seine net 150 can include a top rope 158 that extends through the floats 154 from the given end 156 and the other end 158. In some examples, the rope 158 can have light sources (e.g., fiber optic cable or LEDs) embedded therein. The light sources (embedded in either the floats 154 or the top rope 158) can emit light in the manner described herein. Moreover, the region of the seine net 150, from which light is emitted can be referred to as a top edge 160. Thus, the top edge 160 can form a portion of the top edge of the seine net calibration target 54 of FIG. 1.

A bottom edge of the seine net 150 can be formed with a chain 162. Moreover, a netting 163 can connect the top edge 160 and the bottom edge (the chain 162). The chain 162 can be included for weight and to resist movement due to water flowing through the netting 163. Additionally, in some examples, the seine net 150 can be a purse seine with a purse line 164 that extends through a plurality of rings 166 attached to the netting 163.

The seine net 150 can have a height, H that can also define a height of the seine net calibration target. The height, H of the seine net 150 can be up to about 150 m (often about 10 m). Additionally, the seine can have length, L, which can be up to about 1500 m.

In deployment, the distance between the surface of the water 152 and the top edge 160 can be the depth, S of the seine net 150, which can also define the depth of the seine net calibration target. The depth, S can be up to about 5 m (often about 1 m). In some examples, the top edge 160 can emerge (or partially emerge) form at the surface of the water 152, such that the depth, S can about 0 m. Moreover, the depth S can vary based on the overall mass of the seine net 150 and the buoyancy of the floats 154.

Figure 4:
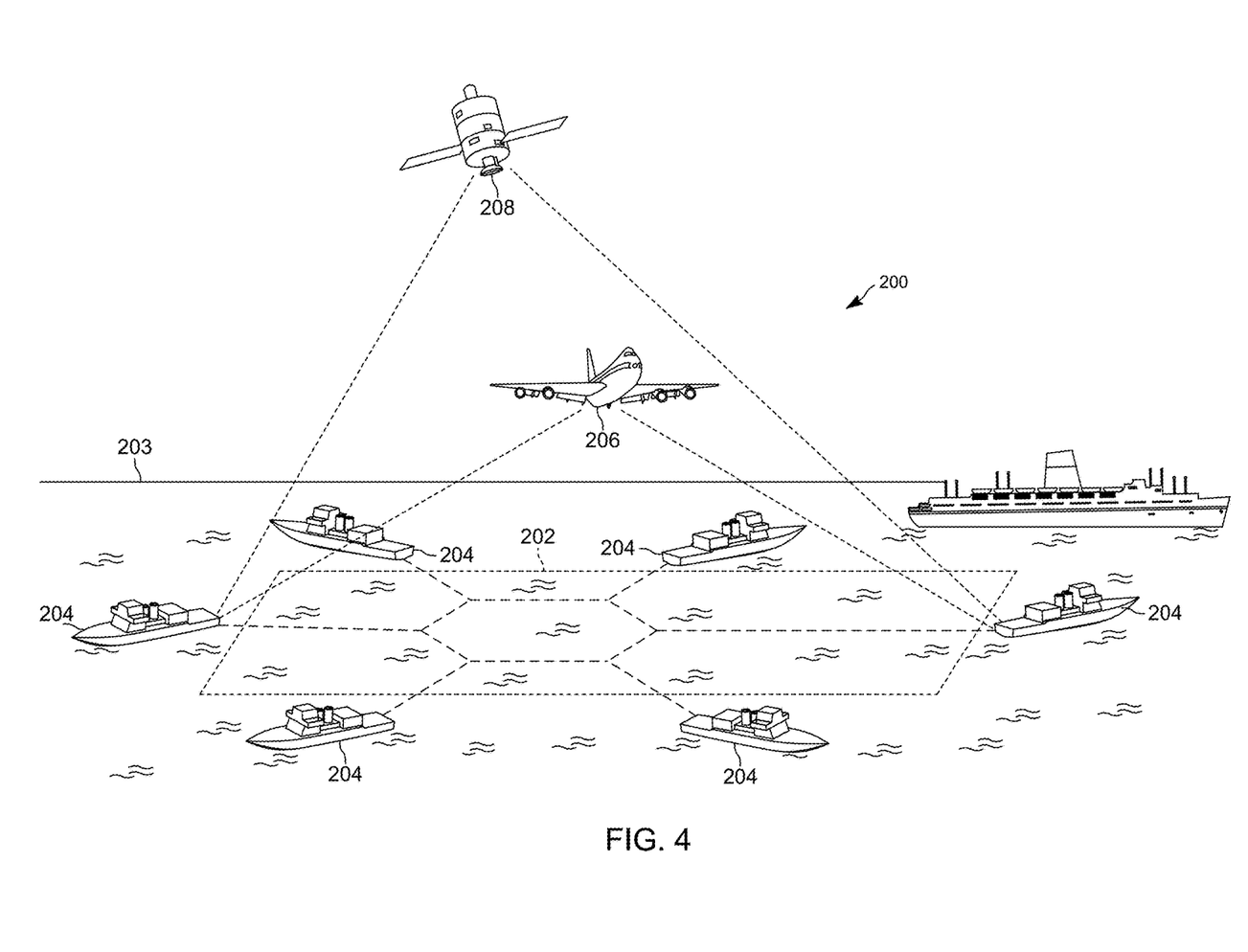
FIG. 4 illustrates a diagram of an example of a seine net calibration target deployed in a body of water.

FIG. 4 illustrates a diagram 200 wherein a seine net calibration target 202 has been deployed in a body of water 203. The seine net calibration target 202 can be employed to implement the seine net calibration target 54 of FIG. 1. The seine net calibration target 202 can be attached to a plurality of boats 204 (e.g., fishing vessels) that can apply tension at ends of the seine net calibration target 302. By applying the tension to the ends of the seine net calibration target 202, a general shape (e.g., a hexagon with radial arms) of the seine net calibration target 202 can be maintained.

An image sensor (e.g., the image sensor 52 of FIG. 1) can be affixed to an aircraft 206 or a satellite 208. The image sensor can capture a portion of light emitted from the seine net calibration target 202 to perform a calibration process in the manner described herein. Additionally or alternatively, the image sensor of the aircraft 206 and/or the satellite 208 can execute a functional typing procedure to detect marine life within the body of water 203.

As depicted in the diagram 200, the seine net calibration target 202 can be easily deployed in remote locations (e.g., by a boat 204) that is away from artificial sources of light to maintain a high contrast between the body of water 203 and the seine net calibration target 202. Furthermore, individual components (e.g., the plurality of seine nets strung together) of the seine net calibration target 202 can be deployed and/or retracted over a time period. Additionally, the boat 204 that deploys or retracts the seine net calibration target 202 can store the seine net calibration target 202 in a hull designed to store fish. In this manner, the need for specialized equipment to deploy or retract the seine net calibration target 202 can be reduced. Moreover, due to the simplicity of the design of the seine net calibration target 200, only minimal and infrequent maintenance, such as battery recharging/changing and/or anti-biofouling techniques may be needed.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A seine net calibration target for an image sensor comprising:
    a given set of seine nets connected to form a polygon; and
    another set of seine nets, wherein each seine net of the other set of seine nets is coupled to a vertex of the polygon at a given end and coupled to a respective one of a plurality of boats at another end; and
    a plurality of light sources arranged along a top edge of the given set of seine nets and the other set of seine nets, wherein the plurality of light sources emit light at a predetermined wavelength.

2. The seine net calibration target of claim 1, wherein each of the plurality of boats applies tension to maintain a shape of the polygon.

3. The seine net calibration target of claim 2, wherein the polygon is a hexagon.

4. The seine net calibration target of claim 1, wherein each seine net in the given set of seine nets and the other set of seine nets comprises:
    a plurality of floats arranged on a rope of a respective seine net, wherein each float in the plurality of floats comprises:
        a casing having a cavity with the rope extending there through; and
        a plurality of light emitting diodes (LEDs) that emit the light at the predetermined wavelength.

5. The seine net calibration target of claim 4, wherein each of the plurality of floats further comprises:
    a controller that controls the output of the LEDs in response to wireless signals.

6. The seine net calibration target of claim 1, wherein each of the plurality of light sources comprises a light emitting diode (LED).

7. The seine net calibration target of claim 1, wherein each seine net in the given set of seine nets and the other set of seine nets comprises:
    a plurality of fiber optic cables that transmit the light at the predetermined wavelength.

8. The seine net calibration target of claim 7, wherein a given set of the plurality of fiber optic cables transmits light in a given spectral band and another set of the plurality of fiber optic cables transmits light in another spectral band.

9. The seine net calibration target of claim 1, wherein each seine net in the other set of seine nets comprises a purse seine net with a purse string passing through a series of rings along a height of the respective seine net.

10. The seine net calibration target of claim 1, wherein the plurality of light sources output light sufficient to saturate at least one pixel of an image sensor deployed on an aircraft.

11. The seine net calibration target of claim 10, wherein the polygon has a circumradius of up to about 175 meters.

12. The seine net calibration target of claim 11, wherein each seine net in the other set of seine nets has a length of up to 1500 meters.

13. The seine net calibration target of claim 1, wherein the seine net calibration target floats beneath a surface of water at a depth of about 1 meter.

14. The seine net calibration target of claim 13, wherein each seine net in the given set of seine nets and the other seine nets has a height of about 10 meters.

15. A seine net calibration target for an image sensor comprising:
    a given set of seine nets connected to form a hexagon; and
    another set of seine nets, wherein each seine net of the other set of seine nets is coupled to a vertex of the hexagon at a given end and coupled to a respective one of a plurality of boats at another end; and
    a plurality of floats arranged at a top edge of the given set of seine nets and the other set of seine nets, wherein each of the plurality of floats comprises:
        a plurality of light sources that emit light at a predetermined wavelength; and
        a controller that controls the output of the light sources.

16. The seine net calibration target of claim 15, wherein the plurality of light sources of each of the plurality of floats comprises a light emitting diode.

17. The seine net calibration target of claim 15, wherein the plurality of floats output light sufficient to saturate at least one pixel of the image sensor.

18. A seine net calibration target for an image sensor comprising:
    a given set of seine nets connected to form a polygon; and
    another set of seine nets, wherein each seine net of the other set of seine nets is coupled to a vertex of the polygon at a given end and coupled to a respective one of a plurality of boats at another end;
    wherein each seine net in the given set of seine nets and the other set of seine nets has a plurality of light sources arranged along a top edge of the respective seine net, wherein the plurality of light sources emit light at a predetermined wavelength or a range of wavelengths and the emitted light is sufficient to saturate at least one pixel of the image sensor.

19. The seine net calibration target of claim 18, wherein the plurality of boats applies a tension that maintains a shape of the polygon.

20. The seine net calibration target of claim 18, wherein each of the plurality of light sources comprises one of a light emitting diode (LED) and a fiber optic cable.

\* \* \* \* \*